(12) United States Patent
Toguchi

(10) Patent No.: US 9,906,752 B2
(45) Date of Patent: Feb. 27, 2018

(54) IMAGING APPARATUS AND CONTROL METHOD THEREOF

(71) Applicant: CANON KABUSHIKI KAISHA, Tokyo (JP)

(72) Inventor: Daisuke Toguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/185,164

(22) Filed: Jun. 17, 2016

(65) Prior Publication Data

US 2016/0373686 A1    Dec. 22, 2016

(30) Foreign Application Priority Data

Jun. 19, 2015  (JP) ................................. 2015-123621

(51) Int. Cl.
| | |
|---|---|
| *H04N 5/77* | (2006.01) |
| *H04N 5/232* | (2006.01) |
| *H04N 5/14* | (2006.01) |

(52) U.S. Cl.
CPC ............. *H04N 5/772* (2013.01); *H04N 5/144* (2013.01); *H04N 5/23254* (2013.01); *H04N 5/23293* (2013.01)

(58) Field of Classification Search
CPC ..... H04N 5/772; H04N 5/23293; H04N 5/144
See application file for complete search history.

(56) References Cited

U.S. PATENT DOCUMENTS

2006/0265731 A1* 11/2006 Matsuda ............. G06F 17/3079
                                                            725/131
2009/0322895 A1* 12/2009 Miyata ................. H04N 1/2145
                                                            348/222.1

FOREIGN PATENT DOCUMENTS

JP        2013-110562 A     6/2013

* cited by examiner

*Primary Examiner* — Mekonnen Dagnew
(74) *Attorney, Agent, or Firm* — Cowan, Liebowitz & Latman, P.C.

(57) ABSTRACT

An imaging apparatus according to the present invention includes: an imaging unit configured to acquire captured image data; and a control unit configured to sequentially display, in response to a first user operation, a predetermined number of captured image data obtained by imaging after a timing at which the first user operation has been performed, in an order starting from the newest imaging time of the captured image data on a display unit.

13 Claims, 5 Drawing Sheets

IMAGING APPARATUS AND CONTROL METHOD THEREOF

BACKGROUND OF THE INVENTION

Field of the Invention

The present invention relates to an imaging apparatus and a control method thereof.

Description of the Related Art

A selective imaging mode of selecting one captured image data among a predetermined number of captured image data (a predetermined number of still images) obtained by imaging is known as an imaging mode of an imaging apparatus. A conventional technique related to the selective imaging mode is disclosed in Japanese Patent Application Publication No. 2013-110562, for example. In the selective imaging mode disclosed in Japanese Patent Application Publication No. 2013-110562, a predetermined number of captured image data are obtained by imaging (continuous shooting) in a period in which a release button is half-pressed, and the obtained predetermined number of captured image data are temporarily stored in a transitory storage memory. Subsequently, a predetermined number of captured image data are sequentially read from the transitory storage memory in an order starting from the oldest imaging time of the captured image data, and the read captured image data are displayed on a screen. In a case where a display process of displaying the predetermined number of captured image data sequentially on the screen is completed, the display process is performed again. Moreover, in a case where the release button is fully pressed in a period in which the predetermined number of captured image data are sequentially displayed on the screen, the captured image data displayed on the screen is recorded in a storage unit at the timing at which the release button is fully pressed. The storage unit stores the captured image data permanently.

SUMMARY OF THE INVENTION

However, in the conventional selective imaging mode, a user needs to check all of the predetermined number of captured image data displayed sequentially at least once in order to check whether captured image data including a desired scene has been obtained by the continuous shooting. Thus, it takes a considerable amount of time to check whether captured image data including a desired scene has been obtained.

The present invention provides a technique of allowing a user to immediately check whether captured image data including a desired scene has been obtained.

The present invention in its first aspect provides an imaging apparatus comprising:

an imaging unit configured to acquire captured image data; and a control unit configured to sequentially display, in response to a first user operation, a predetermined number of captured image data obtained by imaging after a timing at which the first user operation has been performed, in an order starting from the newest imaging time of the captured image data on a display unit.

The present invention in its second aspect provides a control method for an imaging apparatus which acquires captured image data, the control method comprising:

an operating step of receiving a user operation; and a control step of sequentially displaying, in response to a first user operation, a predetermined number of captured image data obtained by imaging after a timing at which the first user operation has been performed, in an order starting from the newest imaging time of the captured image data on a display unit.

The present invention in its third aspect provides a non-transitory computer readable medium that stores a program, wherein the program causes a computer to execute a control method for an imaging apparatus which acquires captured image data, and the control method comprises:

an operating step of receiving a user operation; and a control step of sequentially displaying, in response to a first user operation, a predetermined number of captured image data obtained by imaging after a timing at which the first user operation has been performed, in an order starting from the newest imaging time of the captured image data on a display unit.

According to the present invention, a user can immediately check whether captured image data including a desired scene has been obtained.

Further features of the present invention will become apparent from the following description of exemplary embodiments with reference to the attached drawings.

DESCRIPTION OF THE EMBODIMENTS

First Embodiment

Figure 1:
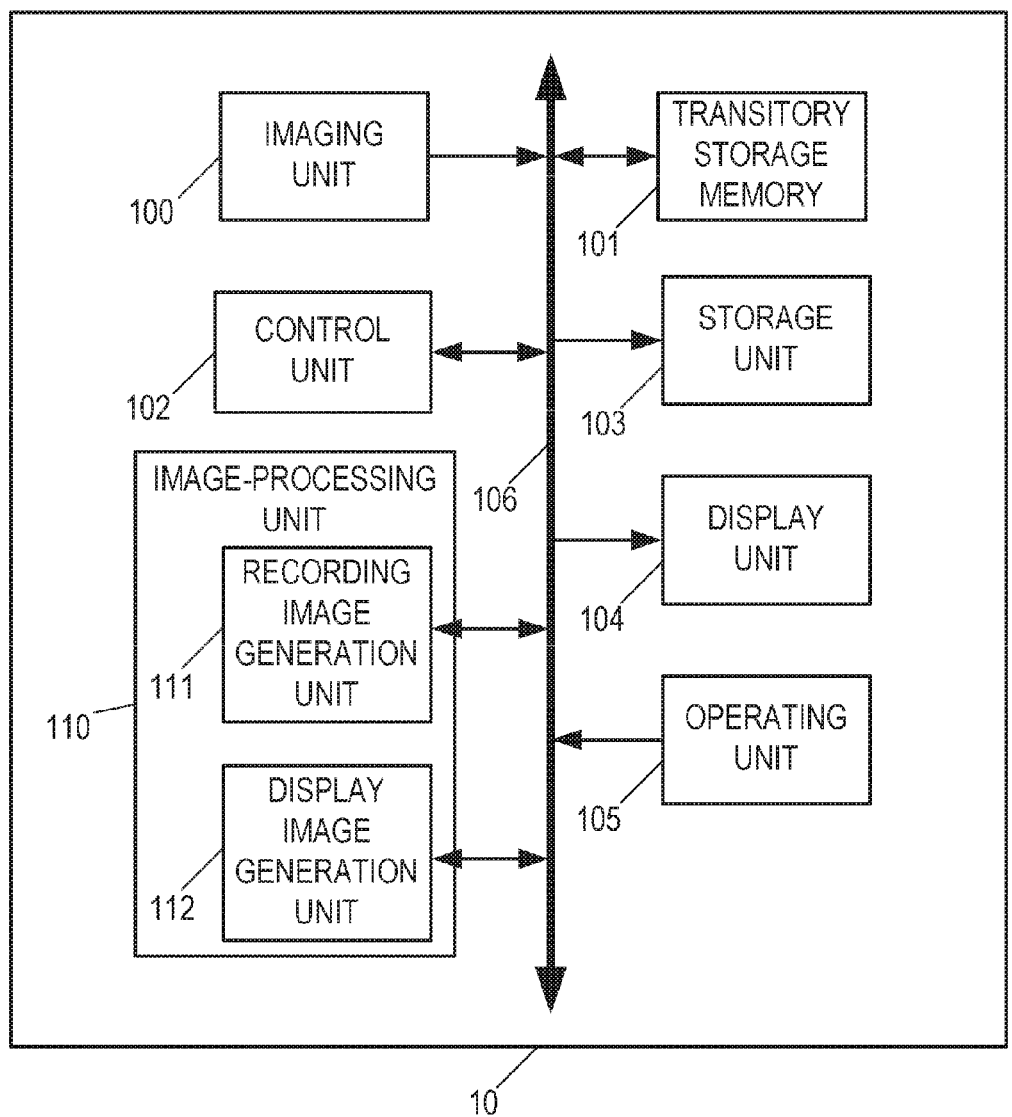
FIG. 1 is a block diagram illustrating an example of a schematic configuration of an imaging apparatus according to a first embodiment.

Hereinafter, a first embodiment of the present invention will be described in detail with reference to the drawings. FIG. 1 is a block diagram illustrating an example of a schematic configuration of an imaging apparatus 10 according to the present embodiment. As illustrated in FIG. 1, the imaging apparatus 10 includes an imaging unit 100, a transitory storage memory 101, a control unit 102, a storage unit 103, a display unit 104, an operating unit 105, and an image-processing unit 110. These functional units are connected to each other via a bus 106. Data is transmitted and received between the functional units via the bus 106.

The control unit 102 controls the processes of the functional units included in the imaging apparatus 10 in an integrated manner. The control unit 102 is configured as a microprocessor or the like, for example.

The imaging unit 100 acquires captured image data by imaging an object. Specifically, the imaging unit 100 acquires captured image data by performing an imaging process using input light. In the imaging process, the input light is converted to an analog electrical signal, and the analog electrical signal is converted to a digital signal (captured image data). For example, raw image data is obtained as the captured image data. The format of the captured image data is not particularly limited. An imaging device such as a CCD image sensor or a CMOS image sensor, for example, can be used as the imaging unit 100.

The transitory storage memory 101 temporarily stores the captured image data obtained by the imaging unit 100, display image data (described later), and the like. The transitory storage memory 101 has a capacity capable of storing a plurality of image data (a plurality of (frames) of still images). High-resolution captured image data, for example, is sequentially recorded in the transitory storage memory 101 according to a first-in-first-out (FIFO) method. The recording of image data in the transitory storage memory 101 is controlled by the control unit 102, for example.

The storage unit 103 permanently stores the captured image data obtained by the imaging unit 100. Specifically, the storage unit 103 permanently stores recording image data described later. A nonvolatile memory, a magnetic disk, an optical disc, and the like can be used as the storage unit 103. The storage unit 103 may be included in the imaging apparatus 10 and may be detachably attached to the imaging apparatus 10. A CF card, an SD card, and the like can be used as the nonvolatile memory that is detachably attached to the imaging apparatus 10. Recording of the captured image data (recording image data) in the storage unit 103 is controlled by the control unit 102, for example. Additional information such as information on the imaging may be recorded in the storage unit 103.

The operating unit 105 receives a user operation. The operating unit 105 has one or more physical buttons, for example. The one or more physical buttons include a release button operated to perform photographing (recording of image data in the storage unit 103). A touch panel may be used as the operating unit 105. A button (display button) displayed on a screen may be used instead of the physical button.

The image-processing unit 110 performs various types of image processing. The image processing performed by the image-processing unit 110 is not particularly limited. In the present embodiment, the image-processing unit 110 includes a recording image generation unit 111 and a display image generation unit 112. The imaging apparatus 10 may not have the image-processing unit 110.

The display image generation unit 112 reads the captured image data obtained by the imaging unit 100 from the transitory storage memory 101 and generates display image data from the read captured image data (first generation process). The display image data generated by the display image generation unit 112 is recorded in the transitory storage memory 101. For example, the display image generation unit 112 performs image processing for generating the display image data and compression processing on the captured image data. Specifically, the display image generation unit 112 performs at least one of a plurality of processes including a format conversion process, a resolution conversion process, a gamma conversion process, a color conversion process, a brightness conversion process, a blur suppression process, a blurring process, and an edge enhancement process on the captured image data. In this way, display image data is generated. The display image generation unit 112 may generation the display image data from the recording image data recorded in the storage unit 103. The process for generating the display image data is not particularly limited.

The recording image generation unit 111 reads the captured image data obtained by the imaging unit 100 from the transitory storage memory 101 and generates recording image data from the read captured image data (second generation process). The recording image data generated by the recording image generation unit 111 is recorded in the storage unit 103. For example, the recording image generation unit 111 performs image processing for generating the recording image data and compression processing on the captured image data. Specifically, the recording image generation unit 111 performs at least one of a plurality of processes including a format conversion process, a resolution conversion process, a gamma conversion process, a color conversion process, a brightness conversion process, a blur suppression process, a blurring process, and an edge enhancement process on the captured image data. In this way, JPEG image data, for example, is generated as the recording image data. The format of the recording image data is not particularly limited. Moreover, the process for generating the recording image data is not particularly limited.

The display unit 104 displays an image based on the captured image data obtained by the imaging unit 100 on the screen. Specifically, the display image data is transferred from the transitory storage memory 101 to the display unit 104, and the display unit 104 displays an image based on the display image data on the screen. A liquid crystal display panel, an organic EL display panel, a plasma display panel, or the like can be used as the display unit 104. Display image data corresponding to the past captured image data can be displayed on the display unit 104. Moreover, display image data corresponding to the present captured image data can be displayed on the display unit 104 on a real-time basis. That is, the display unit 104 can be used as an electronic view finder (EVF). Moreover, information on the imaging can be displayed on the display unit 104. The display unit 104 may be a display device separated from the imaging apparatus 10.

In the present embodiment, a selective imaging mode can be set as an imaging mode of the imaging apparatus 10.

In the selective imaging mode, in response to a first user operation, the control unit 102 repeatedly performs a display process of sequentially displaying a predetermined number of captured image data (a predetermined number of still images) obtained by imaging after the timing at which the first user operation is performed on the display unit 104. In the present embodiment, the display process is a process of sequentially displaying a predetermined number of captured image data on the display unit 104 in an order starting from the newest imaging time of the captured image data. Moreover, in the present embodiment, the display process is a process of sequentially displaying a predetermined number of display image data generated from the predetermined number of captured image data on the display unit 104. Specifically, in response to the first user operation, the control unit 102 stores (records) a predetermined number of captured image data obtained successively in the transitory storage memory 101 (that is, continuous shooting is performed). Moreover, the control unit 102 controls the display image generation unit 112. In this way, the display image generation unit 112 sequentially reads the predetermined number of captured image data from the transitory storage memory 101, generates display image data from the read captured image data, and records the generated display image data in the transitory storage memory 101. After that, the control unit 102 sequentially reads a predetermined number of display image data from the transitory storage memory 101 in an order starting from the newest imaging time of the display image data and inputs the read display image data to the display unit 104. As a result, the predetermined number of display image data are sequentially displayed on the display unit 104 in the order starting from the newest imaging time of the display image data.

The predetermined number of captured image data may not be a predetermined number of captured image data obtained successively. The predetermined number of captured image data may be a predetermined number of captured image data obtained intermittently at a short time interval. The time interval between the imaging times of the predetermined number of captured image data is not particularly limited. Moreover, in the display process, in general, the predetermined number of captured image data are sequentially displayed at a speed slower than the speed (frame rate) at which the predetermined number of captured image data are acquired sequentially (this display process is referred to as a slow display). The speed at which the predetermined number of captured image data are displayed sequentially may be a predetermined fixed speed and the user may change the speed. Moreover, the display process may be performed only once rather than performing the process repeatedly. The predetermined number may be arbitrary. For example, the predetermined number may be 4, 5, 10, 15, or the like.

In the selective imaging mode, in response to a second user operation performed during execution of the display process, the control unit 102 records the captured image data displayed on the display unit 104 at the timing at which the second user operation has been performed in the storage unit 103. In the present embodiment, the control unit 102 records recording image data (corresponding image data) generated from the captured image data which is the original data of the display image data displayed on the display unit 104 at the timing at which the second user operation has been performed in the storage unit 103. Specifically, the control unit 102 controls the recording image generation unit 111 according to the second user operation performed during execution of the display process. In this way, the recording image generation unit 111 generates corresponding image data according to the second user operation performed during execution of the display process and records the generated corresponding image data in the storage unit 103.

The recording image generation unit 111 may generate a predetermined number of recording image data from a predetermined number of captured image data. Moreover, one of the predetermined number of recording image data may be recorded in the storage unit 103 by the control unit 102 controlling the recording image generation unit 111 according to the second user operation. However, in a case where the corresponding image data only is generated, the processing load can be reduced.

In the present embodiment, the first user operation is a user operation of half-pressing the release button, and the second user operation is a user operation of fully pressing the release button. Moreover, the display process is repeatedly performed in a period in which the first user operation is being performed. The first user operation may not be a user operation which is performed continuously. The display process may start according to a first user operation which is temporary (instantaneous). Moreover, the first and second user operations are not limited to the user operations described above. For example, the first user operation may be a user operation of pressing (touching) a first button, and the second user operation may be a user operation of pressing a second button. The first user operation may be a user operation of pressing a third button, and the second user operation may be a user operation of pressing the third button again.

Figure 2:
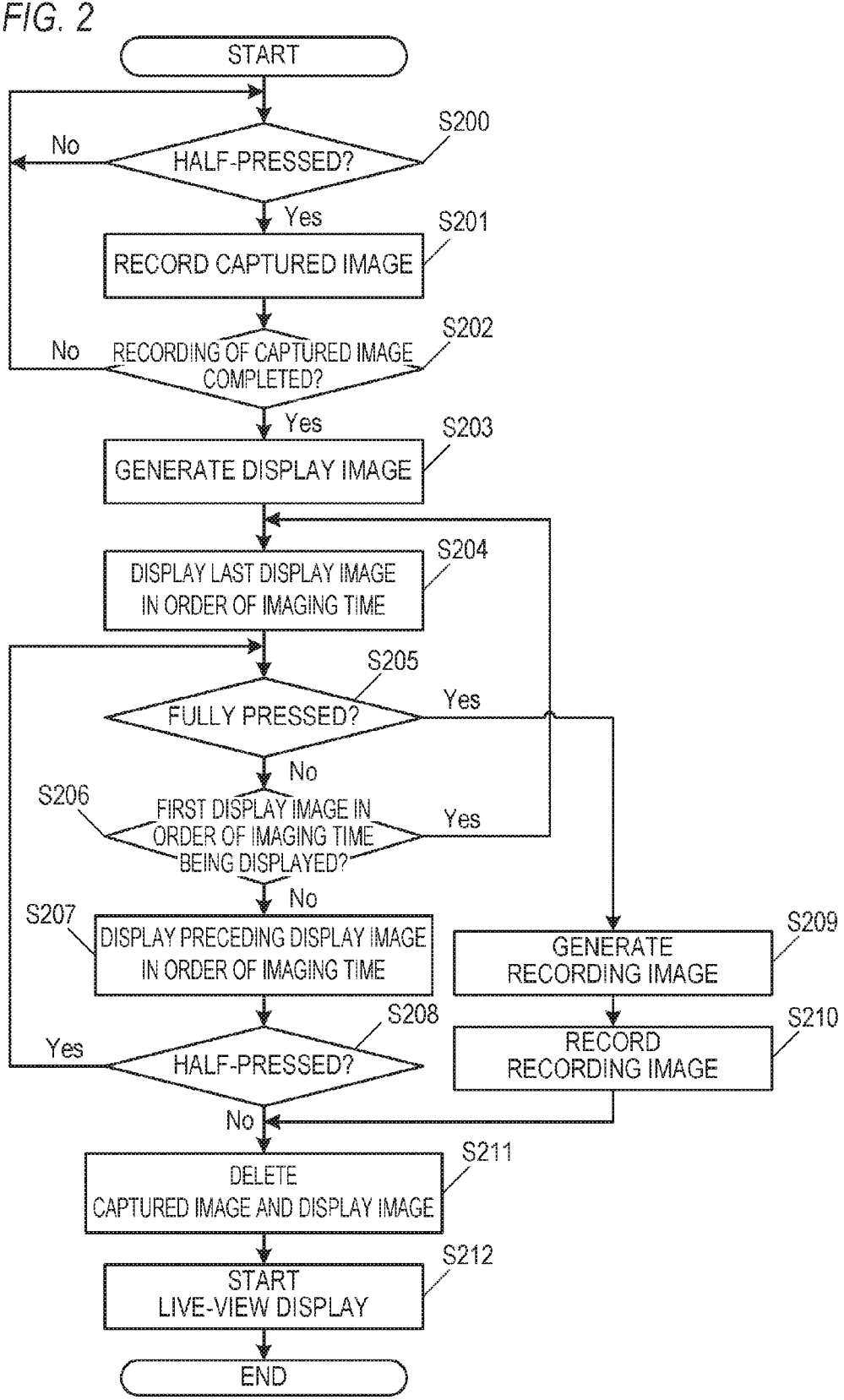
FIG. 2 is a flowchart illustrating an example of a process flow of the imaging apparatus according to the first embodiment.

Next, an example of a process flow of the imaging apparatus 10 will be described with reference to FIG. 2. FIG. 2 is a flowchart illustrating an example of a process flow of the imaging apparatus 10. FIG. 2 illustrates the process flow in a case where a selective imaging mode is set.

First, the control unit 102 determines whether the release button is in a half-pressed state (S200). The process of S200 is repeatedly performed until the release button is half-pressed, and the process proceeds to S201 in a case where the release button is half-pressed.

In S201, the imaging unit 100 starts imaging, and the transitory storage memory 101 stores the captured image data obtained by the imaging.

Subsequently, the control unit 102 determines whether a predetermined number of captured image data have been recorded in the transitory storage memory 101 (S202). In a case where the predetermined number of captured image data have not been recorded in the transitory storage memory 101, the process returns to S200. After the process returns to S200, in a case where the half-pressed state of the release button is released, the control unit 102 deletes all captured image data from the transitory storage memory 101. In a case where the predetermined number of captured image data have been recorded in the transitory storage memory 101, the process proceeds to S203.

In S203, the display image generation unit 112 generates a predetermined number of display image data from the predetermined number of captured image data recorded in the transitory storage memory 101 and records the predetermined number of display image data in the transitory storage memory 101.

Subsequently, the display unit 104 reads the last display image data in the order of the imaging time among the predetermined number of display image data generated in S203 from the transitory storage memory 101 and displays the last display image data (S204). The "last display image data in the order of the imaging time" is the "display image data generated from the captured image data of which the imaging time is the newest".

The control unit 102 determines whether the release button is in a fully pressed state (S205). In a case where the release button is not in the fully pressed state, the process proceeds to S206. In a case where the release button is in the fully pressed state, the process proceeds to S209.

In S206, the control unit 102 determines whether the display image data being displayed presently is the first display image data in the order of the imaging time among the predetermined number of display image data generated in S203. The "first display image data in the order of the imaging time" is the "display image data generated from the captured image data of which the imaging time is the oldest". In a case where the first display image data in the order of the imaging time is displayed, the process returns to S204. In a case where display image data different from the first display image data in the order of the imaging time is displayed, the process proceeds to S207.

In S207, the display unit 104 reads display image data immediately before the display image data being displayed presently in the order of the imaging time among the predetermined number of display image data generated in S203 from the transitory storage memory 101 and displays the display image data (switching of the display). That is, the display unit 104 reads display image data of which the imaging time is the second newest next to the display image data being displayed presently among the predetermined number of display image data generated in S203 from the transitory storage memory 101 and displays the display image data.

Subsequently, the control unit 102 determines whether the release button is in the half-pressed state. In a case where the release button is in the half-pressed state, the process returns to S205. In a case where the release button is not in the half-pressed state, the process returns to S211.

In S209, the recording image generation unit 111 reads the captured image data which is the original data of the display image data being displayed presently from the transitory storage memory 101 and generates recording image data from the read captured image data.

Subsequently, the recording image generation unit 111 records the recording image data generated in S209 in the storage unit 103 (S210). After that, the process proceeds to S211.

In S211, the control unit 102 deletes the predetermined number of captured image data and the predetermined number of display image data from the transitory storage memory 101. The predetermined number of captured image data and the predetermined number of display image data may be deleted from the transitory storage memory 101 after an image (a message, an icon, or the like) indicating that the captured image data and the display image data are to be deleted is displayed on the display unit 104.

Subsequently, the control unit 102 performs predetermined control so as to provide live-view display of displaying display image data corresponding to the present captured image data on the display unit 104 on a real-time basis (S212). That is, the control unit 102 performs predetermined control so that the display unit 104 is used as an EVF.

As described above, according to the present embodiment, a predetermined number of captured image data are sequentially displayed on the display unit in the order starting from the newest imaging time of the captured image data. That is, the predetermined number of captured image data are displayed on the display unit in the reverse order of the imaging time. In this way, the user can immediately check whether captured image data including a desired scene has been obtained as the predetermined number of captured image data. In a case where the captured image data including the desired scene has not been obtained, the user can immediately start a next operation (prepare for the next photographing).

Second Embodiment

Figure 3:
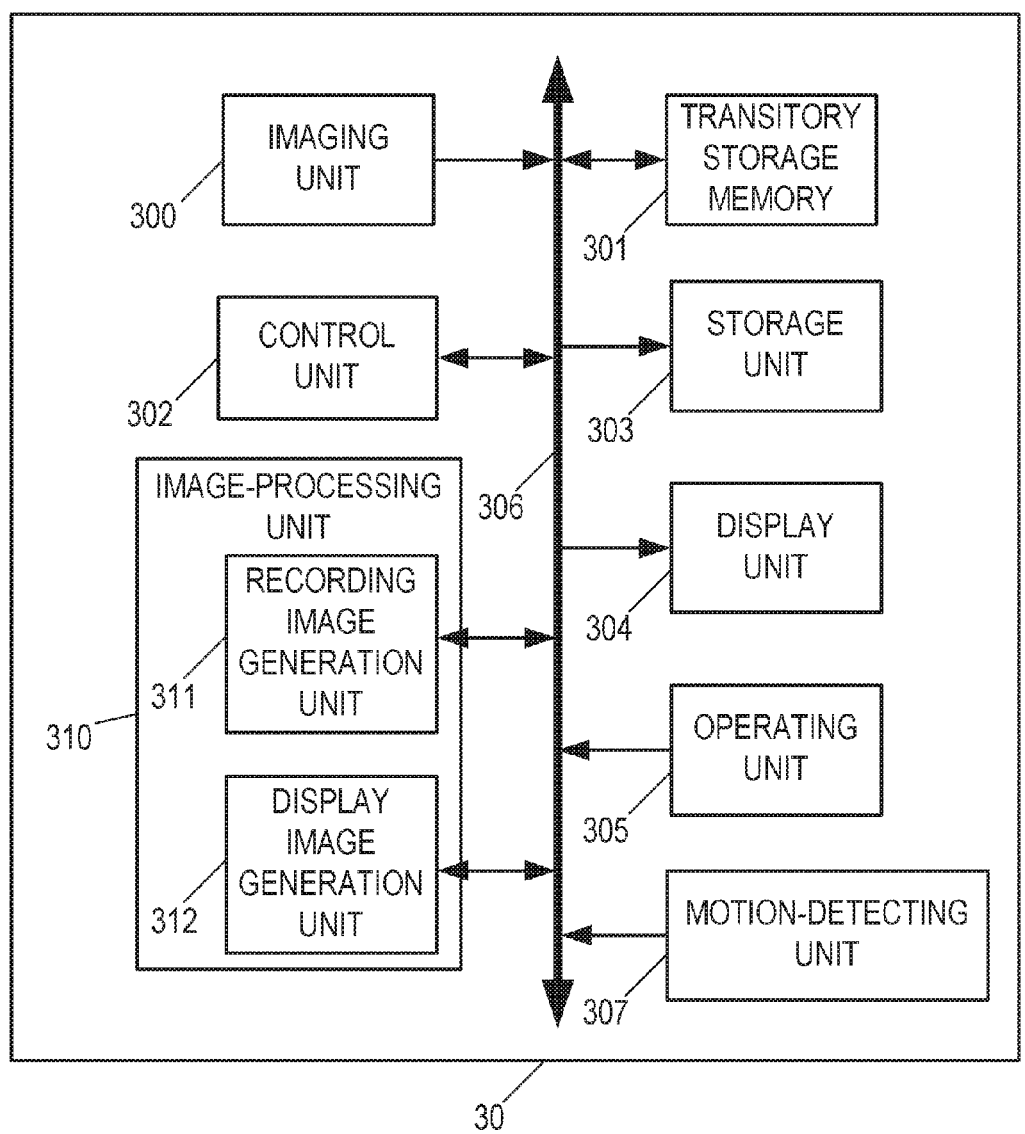
FIG. 3 is a block diagram illustrating an example of a schematic configuration of an imaging apparatus according to a second embodiment.

Hereinafter, a second embodiment of the present invention will be described in detail with reference to the drawings. FIG. 3 is a block diagram illustrating an example of a schematic configuration of an imaging apparatus 30 according to the present embodiment. As illustrated in FIG. 3, the imaging apparatus 30 includes an imaging unit 300, a transitory storage memory 301, a control unit 302, a storage unit 303, a display unit 304, an operating unit 305, an image-processing unit 310, and a motion-detecting unit 307. These functional units are connected to each other via a bus 306. Data is transmitted and received between the functional units via the bus 306. In the present embodiment, the image-processing unit 310 includes a recording image generation unit 311 and a display image generation unit 312.

The imaging unit 300 has the same function as the imaging unit 100 of the first embodiment, the transitory storage memory 301 has the same function as the transitory storage memory 101, and the storage unit 303 has the same function as the storage unit 103. The display unit 304 has the same function as the display unit 104, the operating unit 305 has the same function as the operating unit 105, and the image-processing unit 310 has the same function as the image-processing unit 110. Moreover, the recording image generation unit 311 has the same function as the recording image generation unit 111, and the display image generation unit 312 has the same function as the display image generation unit 112.

The motion-detecting unit 307 detects a motion of an object in an imaging period of obtaining a predetermined number of captured image data based on the predetermined number of captured image data recorded in the transitory storage memory 301 according to a first user operation. Moreover, the motion-detecting unit 307 records a motion value indicating the magnitude of the detected motion in the transitory storage memory 301. The motion of the object and the magnitude thereof can be detected using various conventional techniques. For example, the motion of the object and the magnitude thereof can be detected by block-matching.

An example of the block-matching will be described. In the block-matching, first, a reference block is set in one image A, and a search block is set in the other image B. The reference block and the search block are rectangular areas of a predetermined size, for example. Subsequently, an area (similar area) of the image B similar to the image A in the reference block is detected while changing the position of the search block. A vector directed from one of the position of the reference block and the position of the similar area (the position of the search block set in the similar area) to the other position is detected as a motion vector, and the magnitude of the motion vector is detected as the motion value.

The control unit 302 has the same function as the control unit 102 of the first embodiment. However, the control unit 302 controls the display order of the predetermined number of captured image data (display image data) in the display process based on the motion value obtained by the motion-detecting unit 307. Specifically, in a case where the motion value obtained by the motion-detecting unit 307 is equal to or larger than a threshold, the control unit 302 sequentially displays the predetermined number of captured image data on the display unit 304 in an order starting from the oldest imaging time of the captured image data. Moreover, in a case where the motion value obtained by the motion-detecting unit 307 is smaller than the threshold, the control unit 302 sequentially displays the predetermined number of captured image data on the display unit 304 in an order starting from the newest imaging time of the captured image data. The threshold may be a predetermined fixed value and the user may change the threshold.

Figure 4:
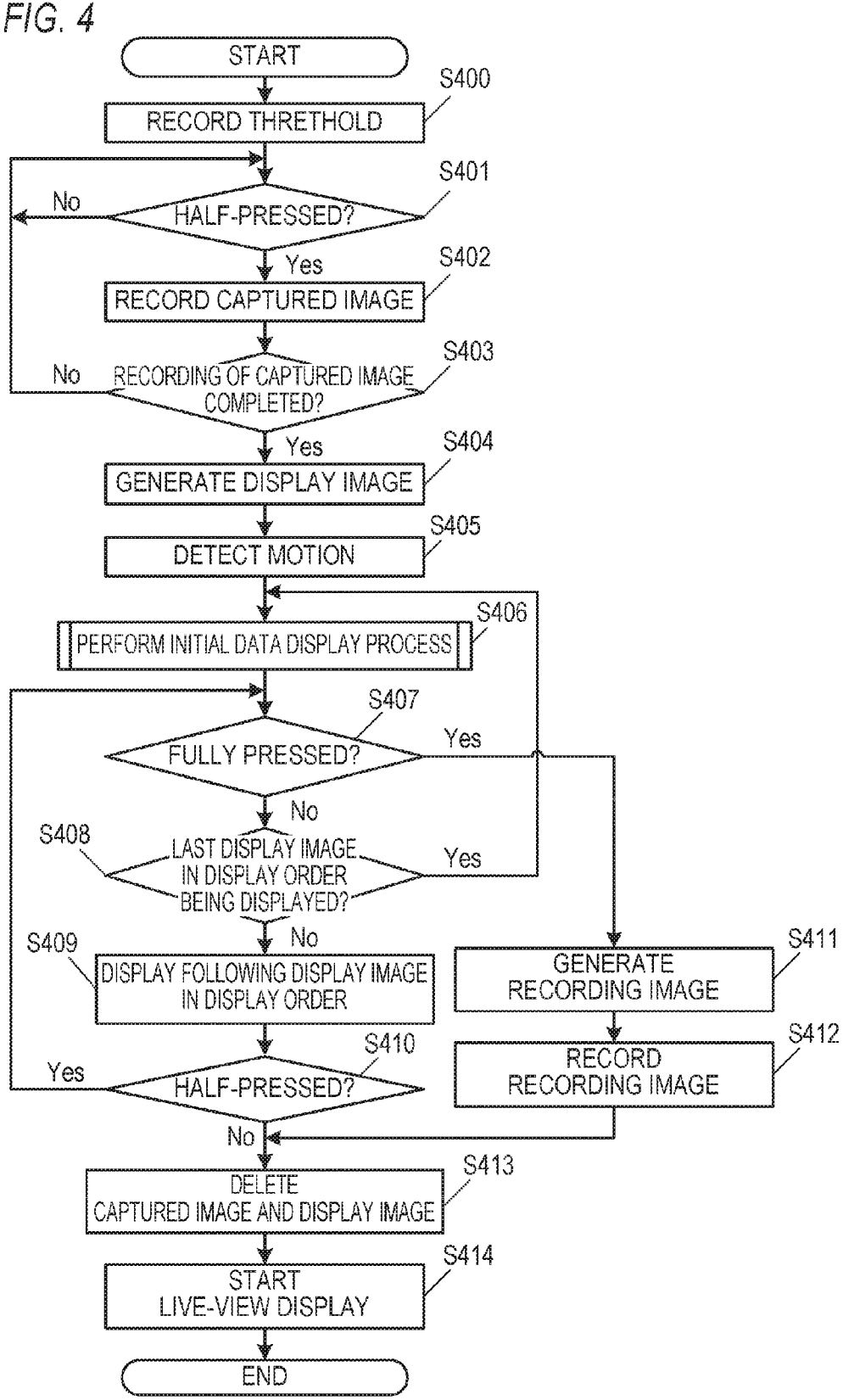
FIG. 4 is a flowchart illustrating an example of a process flow of the imaging apparatus according to the second embodiment.

Next, an example of a process flow of the imaging apparatus 30 will be described with reference to FIG. 4. FIG. 4 is a flowchart illustrating an example of the process flow of the imaging apparatus 30. FIG. 4 illustrates the process flow in a case where a selective imaging mode is set.

First, in response to a user operation on the imaging apparatus 30, the control unit 302 records a threshold of the motion value in the transitory storage memory 301 (S400). For example, the user operation includes an input operation of inputting the threshold to the imaging apparatus 30 and the threshold input by the user is recorded in the transitory storage memory 301.

Subsequently, the control unit 302 determines whether the release button is in a half-pressed state (S401). The process of S401 is repeatedly performed until the release button is half-pressed, and the process proceeds to S402 in a case where the release button is half-pressed.

In S402, the imaging unit 300 starts imaging, and the transitory storage memory 301 stores the captured image data obtained by the imaging.

Subsequently, the control unit 302 determines whether a predetermined number of captured image data have been recorded in the transitory storage memory 301 (S403). In a case where the predetermined number of captured image data have not been recorded in the transitory storage memory 301, the process returns to S401. After the process returns to S401, in a case where the half-pressed state of the release button is released, the control unit 302 deletes all captured image data from the transitory storage memory 301. In a case where the predetermined number of captured image data have been recorded in the transitory storage memory 301, the process proceeds to S404.

In S404, the display image generation unit 312 generates a predetermined number of display image data from the predetermined number of captured image data recorded in the transitory storage memory 301 and records the predetermined number of display image data in the transitory storage memory 301.

Subsequently, the motion-detecting unit 307 detects a motion of an object in an imaging period of obtaining the predetermined number of captured image data using the predetermined number of captured image data recorded in the transitory storage memory 301 in S402 (S405). The motion-detecting unit 307 records a motion value indicating the magnitude of the detected motion in the transitory storage memory 301. For example, the motion-detecting unit 307 acquires the motion value in each of a plurality of areas in an image. The motion-detecting unit 307 records the sum of the plurality of acquired motion values in the transitory storage memory 301. One motion value may be acquired as the motion value in one area, and a plurality of motion values may be acquired. For example, a motion value between reference captured image data and each of a plurality of other captured image data may be acquired for one area. The motion of the object may be detected using the predetermined number of display image data generated in S404.

The display unit 304 reads the first display image data in the display order corresponding to the motion value obtained in S405 among the predetermined number of display image data generated in S404 from the transitory storage memory 301 and displays the display image data (S406: initial data display process).

Figure 5:
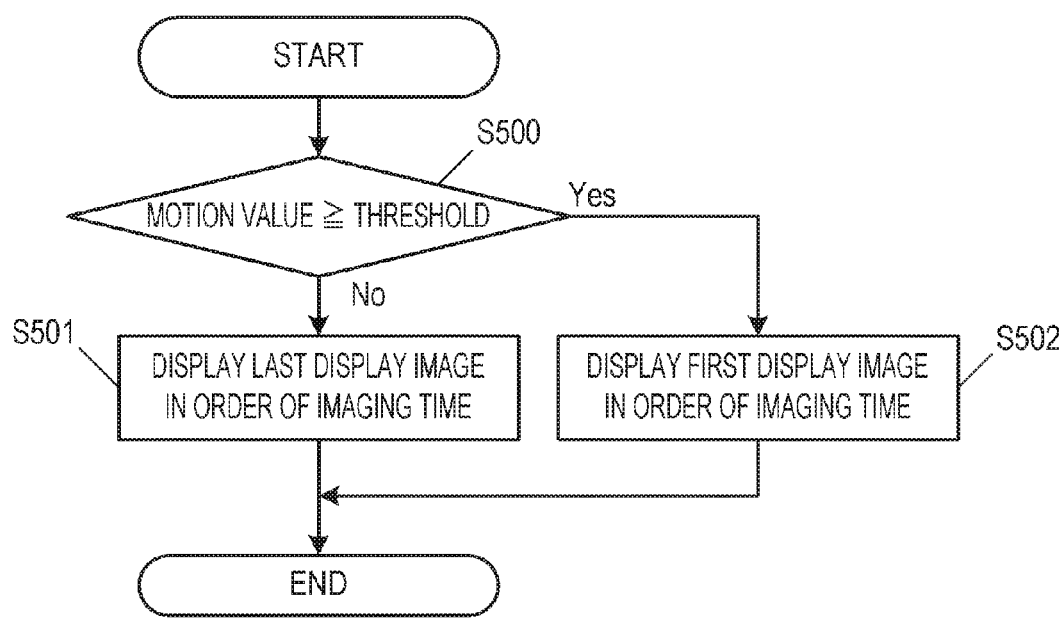
FIG. 5 is a flowchart illustrating an example of an initial data displaying process according to the second embodiment.

Here, the initial data display process of S406 will be described in detail with reference to FIG. 5. FIG. 5 is a flowchart illustrating an example of a process flow of the initial data display process.

First, the control unit 302 reads the motion value obtained in S405 and the threshold recorded in S400 from the transitory storage memory 301 and determines whether the motion value obtained in S405 is equal to or larger than the threshold recorded in S400 (S500). In a case where the motion value is smaller than the threshold, the control unit 302 determines the reverse order of the order of the imaging time as a display order of the predetermined number of display image data and the process proceeds to S501. In a case where the motion value is equal to or larger than the threshold, the control unit 302 determines the order of the imaging time as the display order of the predetermined number of display image data and the process proceeds to S502.

In S501, the display unit 304 reads the last display image data in the order of the imaging time among the predetermined number of display image data generated in S404 from the transitory storage memory 301 and displays the last display image data. In S502, the display unit 304 reads the first display image data in the order of the imaging time among the predetermined number of display image data generated in S404 from the transitory storage memory 301. After the process of S501 or S502 is performed, the process proceeds to S407 of FIG. 4.

In S407, the control unit 302 determines whether the release button is in a fully pressed state. In a case where the release button is not in the fully pressed state, the process proceeds to S408. In a case where the release button is in the fully pressed state, the process proceeds to S411.

In S408, the control unit 302 determines whether the display image data being displayed presently is the last display image data in the display order determined in S500 among the predetermined number of display image data generated in S404. Specifically, in a case where the display order determined in S500 is the reverse order of the order of the imaging time (that is, the motion value is smaller than the threshold), the control unit 302 determines whether the display image data being displayed presently is the first display image data in the order of the imaging time. In a case where the display order determined in S500 is the order of the imaging time (that is, the motion value is equal to or larger than the threshold), the control unit 302 determines whether the display image data being displayed presently is the last display image data in the order of the imaging time. In a case where the display image data being displayed presently is not the last display image data in the display order, the process proceeds to S409. In a case where the display image data being displayed presently is the last display image data in the display order, the process returns to S406. In the second round or later of the initial data display process (S406), the process of S500 of FIG. 5 may be omitted and the process of S501 or S502 may be performed according to the display order determined in the first round of the initial data display process.

Subsequently, the display unit 304 reads display image data immediately after the display image data being displayed presently in the display order determined in S500 among the predetermined number of display image data generated in S404 from the transitory storage memory 301 and displays the display image data (S409). Specifically, in a case where the display order determined in S500 is the reverse order of the order of imaging time, the display unit 304 switches the display to the display image data immediately before the display image data being displayed presently in the order of the imaging time. In a case where the display order determined in S500 is the order of the imaging time, the display unit 304 switches the display to the display image data immediately after the display image data being displayed presently in the order of the imaging time.

Subsequently, the control unit 302 determines whether the release button is in the half-pressed state (S410). In a case where the release button is in the half-pressed state, the process returns to S407. In a case where the release button is not in the half-pressed state, the process returns to S413.

In S411, the recording image generation unit 311 reads the captured image data which is the original data of the display image data being displayed presently from the transitory storage memory 301 and generates recording image data from the read captured image data.

Subsequently, the recording image generation unit 311 records the recording image data generated in S411 in the storage unit 303 (S412). After that, the process proceeds to S413.

In S413, the control unit 302 deletes the predetermined number of captured image data and the predetermined number of display image data from the transitory storage memory 301. The motion value and the threshold may be further deleted from the transitory storage memory 301.

Next, the control unit 302 performs predetermined control so as to provide live-view display (S414).

In a case where captured image data including a desired scene has been obtained as the predetermined number of captured image data, it is preferable to display the predetermined number of captured image data in the order of the imaging time. In a case where captured image data including a desired scene has not been obtained as the predetermined number of captured image data, it is preferable to display the predetermined number of captured image data in the reverse order of the order of the imaging time in order to obtain confirmation from the user. Here, in a case where the motion of the object is large, it is highly likely that captured image data including a desired scene has been obtained as the predetermined number of captured image data. In a case where the motion of the object is small, it is highly likely that captured image data including a desired scene has not been obtained as the predetermined number of captured image data.

According to the present embodiment, a motion of an object is detected in an imaging period of obtaining a predetermined number of captured image data. Moreover, the predetermined number of captured image data are sequentially displayed on a display unit according to the magnitude of the detected motion. Specifically, in a case where the magnitude of the detected motion is equal to or larger than a threshold, the predetermined number of captured image data are sequentially displayed in the order starting from the oldest imaging time of the captured image data. In a case where the magnitude of the detected motion is smaller than the threshold, the predetermined number of captured image data are sequentially displayed in the order starting from the newest imaging time of the captured image data. As a result, it is possible to appropriately switch the display order of the predetermined number of captured image data. Moreover, in a case where it is highly likely that captured image data including a desired scene has not been obtained as the predetermined number of captured image data, the user can immediately check whether captured image data including a desired scene has been obtained as the predetermined number of captured image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-123621, filed on Jun. 19, 2015, which is hereby incorporated by reference herein in its entirety.

What is claimed is:

1. An imaging apparatus comprising:
   an imaging unit configured to acquire captured image data; and
   one or more processors which, by executing the program, function as:
      a control unit configured to sequentially display, in response to a first user operation, a predetermined number of captured image data obtained by imaging after a timing at which the first user operation has been performed, in an order starting from a newest imaging time of the captured image data on a display unit; and
      a detecting unit configured to detect a motion of an object in an imaging period of obtaining the predetermined number of captured image data, based on the predetermined number of captured image data, wherein
   in a case where a magnitude of the motion detected by the detecting unit is equal to or larger than a threshold, the control unit sequentially displays the predetermined number of captured image data in an order starting from the oldest imaging time of the captured image data on the display unit, and
   in a case where the magnitude of the motion detected by the detecting unit is smaller than the threshold, the control unit sequentially displays the predetermined number of captured image data in the order starting from the newest imaging time of the captured image data on the display unit.

2. The imaging apparatus according to claim 1, further comprising:
   a recording unit configured to record, in response to a second user operation performed during execution of a process of sequentially displaying the predetermined number of captured image data on the display unit, captured image data displayed on the display unit at a timing at which the second user operation has been performed, in a storage unit.

3. The imaging apparatus according to claim 2, further comprising:
   a first generation unit configured to generate display image data from the captured image data; and a second generation unit that generates recording image data from the captured image data, wherein the control unit sequentially displays a predetermined number of display image data generated from the predetermined number of captured image data on the display unit, and the recording unit records recording image data generated from captured image data which is original data of the display image data displayed on the display unit at the timing at which the second user operation has been performed, in the storage unit.

4. The imaging apparatus according to claim 3, wherein
in response to the second user operation performed during execution of a process of sequentially displaying the predetermined number of display image data on the display unit, the second generation unit generates recording image data from captured image data which is original data of the display image data displayed on the display unit at the timing at which the second user operation has been performed.

5. The imaging apparatus according to claim 2, wherein
the control unit sequentially displays the predetermined number of display image data on the display unit in a period in which the first user operation is being performed.

6. The imaging apparatus according to claim 5, wherein
the first user operation is a user operation of half-pressing a release button, and
the second user operation is a user operation of fully pressing the release button.

7. A control method for an imaging apparatus which acquires captured image data, the control method comprising:

an operating step of receiving a user operation;
a control step of sequentially displaying, in response to a first user operation, a predetermined number of captured image data obtained by imaging after a timing at which the first user operation has been performed, in an order starting from a newest imaging time of the captured image data on a display unit; and
a detecting step of detecting a motion of an object in an imaging period of obtaining the predetermined number of captured image data, based on the predetermined number of captured image data, wherein
in a case where a magnitude of the motion detected in the detecting step is equal to or larger than a threshold, in the control step, the predetermined number of captured image data are sequentially displayed in an order starting from the oldest imaging time of the captured image data on the display unit, and
in a case where the magnitude of the motion detected in the detecting step is smaller than the threshold, in the control step, the predetermined number of captured image data are sequentially displayed in the order starting from the newest imaging time of the captured image data on the display unit.

8. The control method according to claim 7, further comprising:
a recording step of recording, in response to a second user operation performed during execution of a process of sequentially displaying the predetermined number of captured image data on the display unit, captured image data displayed on the display unit at a timing at which the second user operation has been performed, in a storage unit.

9. The control method according to claim 8, further comprising:
a first generation step of generating display image data from the captured image data; and
a second generation step of generating recording image data from the captured image data, wherein
in the control step, a predetermined number of display image data generated from the predetermined number of captured image data are sequentially displayed on the display unit, and
in the recording step, recording image data generated from captured image data which is original data of the display image data displayed on the display unit at the timing at which the second user operation has been performed, is recorded in the storage unit.

10. The control method according to claim 9, wherein
in the second generation step, in response to the second user operation performed during execution of a process of sequentially displaying the predetermined number of display image data on the display unit, recording image data is generated from captured image data which is original data of the display image data displayed on the display unit at the timing at which the second user operation has been performed.

11. The control method according to claim 8, wherein
in the control step, the predetermined number of display image data are sequentially displayed on the display unit in a period in which the first user operation is being performed.

12. The control method according to claim 11, wherein
the first user operation is a user operation of half-pressing a release button, and
the second user operation is a user operation of fully pressing the release button.

13. A non-transitory computer readable medium that stores a program, wherein
the program causes a computer to execute a control method for an imaging apparatus which acquires captured image data,
the control method comprises:
an operating step of receiving a user operation;
a control step of sequentially displaying, in response to a first user operation, a predetermined number of captured image data obtained by imaging after a timing at which the first user operation has been performed, in an order starting from a newest imaging time of the captured image data on a display unit; and
a detecting step of detecting a motion of an object in an imaging period of obtaining the predetermined number of captured image data, based on the predetermined number of captured image data,
in a case where a magnitude of the motion detected in the detecting step is equal to or larger than a threshold, in the control step, the predetermined number of captured image data are sequentially displayed in an order starting from the oldest imaging time of the captured image data on the display unit, and
in a case where the magnitude of the motion detected in the detecting step is smaller than the threshold, in the control step, the predetermined number of captured image data are sequentially displayed in the order starting from the newest imaging time of the captured image data on the display unit.

* * * * *